United States Patent
Dubey et al.

(10) Patent No.: US 9,067,383 B2
(45) Date of Patent: Jun. 30, 2015

(54) FLEXIBLE AND ROLLABLE CEMENTITIOUS MEMBRANE AND METHOD OF MANUFACTURING IT

(75) Inventors: Ashish Dubey, Grayslake, IL (US); Pete Groza, Round Lake Beach, IL (US); David Bruce McDonald, Glenview, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 706 days.

(21) Appl. No.: 11/224,398

(22) Filed: Sep. 12, 2005

(65) Prior Publication Data

US 2006/0054059 A1 Mar. 16, 2006

Related U.S. Application Data

(60) Provisional application No. 60/610,389, filed on Sep. 16, 2004.

(51) Int. Cl.
*B28B 11/00* (2006.01)
*B32B 5/26* (2006.01)
(Continued)

(52) U.S. Cl.
CPC . *B32B 5/26* (2013.01); *B32B 25/10* (2013.01); *B32B 25/12* (2013.01); *B32B 27/12* (2013.01);
(Continued)

(58) Field of Classification Search
CPC .. C04B 24/2641; C04B 28/02; C04B 28/021; C04B 18/08; C04B 2111/50; B32B 2255/26; B32B 17/02; B32B 27/308; B32B 5/26; D06N 3/0063; D06N 7/00; E04F 15/18
USPC .................. 428/34.4, 364; 442/320
See application file for complete search history.

(56) References Cited

U.S. PATENT DOCUMENTS 4,229,329 A  10/1980 Bennett
4,441,944 A  4/1984 Massey
(Continued)

FOREIGN PATENT DOCUMENTS

JP  61-155270  7/1986
JP  63-197835  12/1988
(Continued)

OTHER PUBLICATIONS

University of California, Berkeley; 2003 Bearkelium; Concrete Canoe Design Report.

(Continued)

*Primary Examiner* — James Yager
(74) *Attorney, Agent, or Firm* — Greer, Burns & Crain, Ltd.; Pradip Sahu; Philip T. Petti

(57) ABSTRACT

In a preferred embodiment, a membrane for use as an underlayment includes a basemat, which includes at least three plies, a ply of a meltblown polymer sandwiched between two plies of spunbond polymer; and a flexible coating applied to the basemat, the coating having a cementitious hydraulic component, a polymer comprising a water-soluble, film-forming polymer; and water. The finished membrane is flexible. Another embodiment for an underlayment for use underneath ceramic tiles includes a basemat and a coating of a set hydraulic component less than ⅛" inches thick.
A method of making the flexible membrane includes assembling components including a hydraulic component, a water-soluble, film-forming polymer and water, then mixing them to form a coating. A basemat is provided onto which the coating is applied over a flexible surface or no surface. After coating at least one face of the basemat, the coating is dried to form the membrane.

11 Claims, 1 Drawing Sheet

(51) Int. Cl.
*B32B 25/10* (2006.01)
*B32B 25/12* (2006.01)
*B32B 27/12* (2006.01)
*B32B 27/30* (2006.01)
*C04B 28/02* (2006.01)
*D06N 3/00* (2006.01)
*D06N 7/00* (2006.01)
*E04F 15/18* (2006.01)
*C04B 111/00* (2006.01)
*C04B 111/50* (2006.01)

(52) U.S. Cl.
CPC ........... *B32B 27/308* (2013.01); *B32B 2250/04* (2013.01); *B32B 2255/10* (2013.01); *B32B 2255/26* (2013.01); *B32B 2307/7265* (2013.01); *B32B 2419/04* (2013.01); *B32B 2607/02* (2013.01); *C04B 28/02* (2013.01); *C04B 2111/00612* (2013.01); *C04B 2111/00801* (2013.01); *C04B 2111/50* (2013.01); *D06N 3/0063* (2013.01); *D06N 7/00* (2013.01); *E04F 15/18* (2013.01)

(56) References Cited

U.S. PATENT DOCUMENTS

| | | | |
|---|---|---|---|
| 4,475,032 A | 10/1984 | Popma et al. | |
| 4,588,443 A | 5/1986 | Bache | |
| 4,617,219 A * | 10/1986 | Schupack | 428/113 |
| 4,714,722 A | 12/1987 | Najvar et al. | |
| 4,745,032 A | 5/1988 | Morrison | |
| 5,439,518 A * | 8/1995 | Francis et al. | 106/705 |
| 5,549,859 A | 8/1996 | Andersen et al. | |
| 5,725,652 A * | 3/1998 | Shulman | 106/677 |
| 5,965,257 A | 10/1999 | Ahluwalia | |
| 6,167,668 B1 | 1/2001 | Fine et al. | |
| 6,378,259 B1 * | 4/2002 | Carlson | 52/408 |
| 6,455,615 B2 | 9/2002 | Yu et al. | |
| 6,569,923 B1 | 5/2003 | Slagter | |
| 6,586,353 B1 * | 7/2003 | Kiik et al. | 442/320 |
| 7,056,583 B2 | 6/2006 | Stewart | |
| 2002/0121229 A1 * | 9/2002 | Jardine et al. | 106/681 |
| 2004/0077247 A1 | 4/2004 | Schmidt et al. | |
| 2004/0247913 A1 | 12/2004 | Stewart | |

FOREIGN PATENT DOCUMENTS

| | | |
|---|---|---|
| JP | 03-294559 | 12/1991 |
| JP | 05-066086 | 8/1993 |
| JP | 05-331779 | 12/1993 |
| JP | 2000-000906 | 1/2000 |
| JP | 2001-048233 | 2/2001 |
| JP | 2001-193271 | 7/2001 |
| JP | 2004-108006 | 4/2004 |
| WO | WO 94/12820 | 6/1994 |
| WO | WO 96/24561 | 8/1996 |

OTHER PUBLICATIONS

University of Alabama in Huntsville; 2000 Concrete Canoe Design Report; "Ingenuity"; Designing reinforced concrete from a new perspective.

The Sydney Morning Herald; May 28, 1987; It Flies . . . Here's Concrete Evidence.

Clemson University Concrete Canoe Team "Instinct".

* cited by examiner

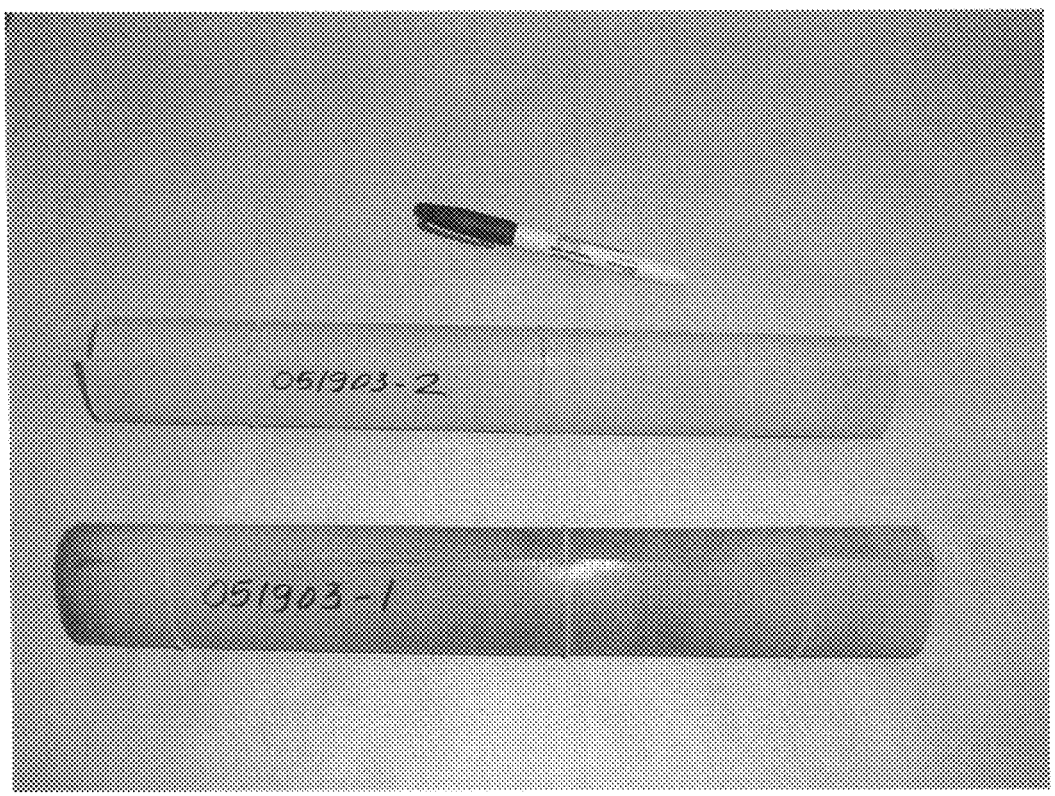

FLEXIBLE AND ROLLABLE CEMENTITIOUS MEMBRANE AND METHOD OF MANUFACTURING IT

CROSS REFERENCE TO RELATED APPLICATIONS

This application claims the benefit of U.S. Provisional Ser. No. 60/610,389, filed Sep. 16, 2004, and is related to U.S. Ser. No. 11/1224,403,entitled, "Flexible Hydraulic Compositions," filed concurrently herewith, now U.S. Pat. No. 7,347,895 and its divisional application Ser. No. 11/900,495, now U.S. Pat. No. 7,468,154, all of which are herein incorporated by reference.

This invention relates to flexible and rollable cementitious construction membranes. In one embodiment, a thin hydraulic layer on a basemat is used as an underlayment for laying ceramic tile. Other embodiments are directed to flexible hydraulic compositions for underlayments, membranes and the like.

BACKGROUND OF THE INVENTION

Ceramic tiles and natural stones are both beautiful and practical as surface coverings on floors and walls. They may be waterproof, easily cleaned, durable and can be decorated with an infinite variety of colors and designs. Recently they have become quite popular for use in bathrooms, kitchens and foyers where water is frequently present.

House construction commonly calls for wood to be used as subfloors and drywall to be installed on walls. If wood or drywall is repeatedly exposed to water, it swells as it soaks up water, then contracts as the water evaporates. These repeated cycles of expansion and contraction breaks down the cell walls, causing the substrate to soften, decay and disintegrate over time. When wet, these substrates may also be susceptible to attack by molds, causing additional damage.

If finish surface materials such as ceramic tiles and natural stones are applied directly to wood or drywall, cycles of swelling and drying, and the resultant damage, cause problems with cracking and breaking of the finish surface. Ceramic tiles and natural stones are very rigid and brittle materials, and do not give or stretch when the substrate deflects or moves. When the substrate deflects or moves, the attached tile moves with it causing the tile to crack or break when adjacent areas of substrate move. If a cracked or broken tile is not replaced immediately, water will be able to seep through the crack, causing even more swelling and drying of the substrate, resulting further damage to the ceramic tiles.

Typically, $5/16"$ or $1/2"$ cement board, such as DUROCK® Brand Cement Board manufactured by USG Corporation, Chicago, Ill., is used under ceramic tile to provide a compatible surface for bonding to the adhesive tile and to provide an underlayment that does not move laterally. If exposed to water, cement does not swell or degrade and it adds strength and stability under the tiles.

However, the use of cement board has certain disadvantages. A half inch thick cement board weighs about 3 pounds per square foot, and can cause fatigue in those who move it to or around the job site or while placing it in position to receive the ceramic tile. Fastening of the cement board to the subfloor requires a large number of fasteners that add extra labor to the cost of the job. Frequently, the board is cut to fit the underlayment at the edges or to go around corners or cabinets. During and after cutting, alkaline fibers in the dust and exposed edges can be irritating to skin or lungs. Cement board is not waterproof and allows transmission of liquids through it. Thus, attempts have been made in the prior art to find an underlayment that is a good adhesive surface, does not move, yet is lighter in weight and less irritating than cement board.

Plastic sheeting has been used as an underlayment for ceramic tiles. It is thin, lightweight and provides a waterproof barrier. However, plastic has a poor surface for bonding of the mortar used to adhere the tiles.

Thin layers of a lightweight, waterproof concrete composition were used to make concrete canoes by engineering students at several universities for a contest in 2003. The University of Alabama at Huntsville team used a mixture of Portland cement, a latex, an acrylic fortifier, plastic microspheres and water. This mixture produced a composition that had good workability and water resistance. It had a weight of only 14.7 pounds per cubic foot.

U.S. Pat. No. 6,455,615 to Yu discloses a flexible polymer modified cement that can be used alone or on a substrate. It is disclosed for use in concealed areas of construction engineering, water conservancy projects and municipal works. A hydraulic cement, a polymer dispersion and water are calendared to form sheets, then dried until the composition is firm. The hydraulic material optionally includes from 20% to about 50% other hydraulic materials, including fly ash, silica fume, metakaolin and slag.

SUMMARY OF THE INVENTION

These and other problems are addressed by an improved membrane for use as an underlayment for ceramic tile. The membrane includes a basemat; and a flexible coating applied to the basemat, the coating including a hydraulic component comprising at least 50% fly ash by weight; a polymer comprising a water-soluble, film-forming polymer; and water.

In a preferred embodiment, a membrane for use as an underlayment for ceramic tile includes a basemat which includes at least three plies, a center ply of a meltblown polymer sandwiched between two plies of spunbond polymer; and a flexible coating applied to the basemat, the coating having a hydraulic component, a polymer comprising a water-soluble, film-forming polymer; and water. Use of this specific basemat to make a coated membrane results in a product that is waterproof, soft to the touch, strong and extremely flexible even though coated with a hydraulic cementitious slurry. The spunbond layers hold the slurry, which binds the fibers in those layers into a crystalline matrix as the hydraulic material hydrates.

Another embodiment of an underlayment for use underneath ceramic tiles includes a basemat and a coating less than $1/8"$ inches in thickness comprising a set hydraulic component. Production of very thin underlayments is not only economical due to use of fewer raw materials, but the smaller physical size reduces the cost of shipping and storing the finished product. The thinness of the product also allows it to be flexible, so that even cement coated basemat can be rolled for compact shipping and storage.

One embodiment of the method of making the flexible membrane includes assembling components including a hydraulic component, a water-soluble, film-forming polymer and water and mixing them to form a coating. A basemat is provided onto which the coating is applied over a flexible surface or no surface. After coating at least one face of the basemat, the coating is dried to form the membrane.

Another embodiment of the method of making a floor underlayment includes obtaining a hydraulic component comprising at least 50% fly ash; a film-forming, water-soluble polymer and water; mixing the hydraulic component, polymer and water in a high-sheer mixer to form a slurry;

pouring the slurry onto a basemat having at least one face; and spreading the slurry over at least one face of the basemat; and drying the slurry.

The waterproof membrane for use between a substrate and ceramic tiles is obtained that is extremely flexible and resilient. It has very good tolerance to damage even after severe, repeated deformation cycles. The membrane has good moisture resistance and moisture durability. The slurry sets very rapidly, especially when dried in an oven or kiln. There is virtually no plastic shrinkage induced cracking as the product dries. Water demand for processing is very low, and the mixture is flowable and self-leveling even at low water addition rates.

DETAILED DESCRIPTION OF THE DRAWINGS

FIG. 1 shows the flexibility of the membranes of Example 3.

DETAILED DESCRIPTION OF THE INVENTION

Flexible hydraulic materials are made suitable for use, among other things, as underlayment for ceramic tiles. In a first embodiment, a cementitious slurry is thinly applied to a mesh or scrim. Other embodiments do not require a support mesh when an optional water-soluble, film forming polymer is added to the cement slurry. Unless otherwise noted, amounts or concentrations reported herein describing the compositions are on a weight basis.

Any hydraulic materials are useful in the instant composition. Class C hydraulic fly ash, which is a high lime content fly ash obtained from the processing of certain coals, or its equivalent, is the most preferred hydraulic material. ASTM designation C-618 describes the characteristics of Class C fly ash (Bayou Ash Inc., Big Cajun, II, La.). When mixed with water, the fly ash sets similarly to a cement or gypsum. Use of other hydraulic materials in combination with fly ash is contemplated, including cements, including high alumina cements, calcium sulfates, including calcium sulfate anhydrite, calcium sulfate hemihydrate or calcium sulfate dihydrate, lime, other hydraulic materials and combinations thereof. Mixtures of fly ashes are also contemplated for use. Silica fume (SKW Silicium Becancour, St. Laurent, Quebec, Calif.) is another preferred material.

While not wishing to be bound by theory, it is believed that the shape of the fly ash particle contributes to the rheological characteristics of this composition. The substantially spherical shape of fly ash creates a "ball bearing" effect in the mix, improving workability of the composition without increasing water requirements. In addition, some fly ashes have been shown to significantly decrease heat generation as the concrete hardens and strengthens. Fly ash, as do all pozzolanic materials, generally provides increased strength gain for much longer periods than mixes with Portland cement (St. Mary's Cement Inc., Detroit, Mich.) only.

Another reason fly ash is preferred in this composition is the increased life cycle expectancy and increase in durability associated with its use. During the hydration process, fly ash chemically reacts with the calcium hydroxide forming calcium silicate hydrate and calcium aluminate, which reduces the risk of leaching calcium hydroxide, making the composition less permeable. Fly ash also improves the permeability of hydraulic compositions by lowering the water-to-cement ratio, which reduces the volume of capillary pores remaining in the set composition. The spherical shape of fly ash improves the consolidation of the composition, which also reduces permeability. It is also theorized that tricalcium aluminate, which is frequently present in fly ash, acts as a set accelerator to speed up the setting reactions.

In some embodiments of the invention, the hydraulic component includes at least 50% hydraulic fly ash by weight. Preferably, the hydraulic component includes at least 55% hydraulic fly ash. More preferably, the hydraulic component includes at least 60% hydraulic fly ash. More preferably, the hydraulic component includes at least 65% hydraulic fly ash. More preferably, the hydraulic component includes at least 70% hydraulic fly ash. More preferably, the hydraulic component includes at least 75% hydraulic fly ash. More preferably, the hydraulic component includes at least 80% hydraulic fly ash. More preferably, the hydraulic component includes at least 85% hydraulic fly ash. More preferably, the hydraulic component includes at least 90% hydraulic fly ash. More preferably, the hydraulic component includes at least 95% hydraulic fly ash. More preferably, the hydraulic component includes at least 99% or essentially all hydraulic fly ash. The remainder of the hydraulic component includes any hydraulic materials or mixtures thereof. In some preferred embodiments, the hydraulic component is essentially all hydraulic fly ash.

The total composition preferably includes from about 40% to about 92.5% by weight of the hydraulic component. More preferably, the hydraulic component makes up from about 45% to about 92.5% by weight of the composition. More preferably, the hydraulic component makes up from about 50% to about 92.5% by weight of the composition. More preferably, the hydraulic component makes up from about 55% to about 92.5% by weight of the composition. More preferably, the hydraulic component makes up from about 60% to about 92.5% by weight of the composition. More preferably, the hydraulic component makes up from about 65% to about 92.5% by weight of the composition. More preferably, the hydraulic component makes up from about 45% to about 85% by weight of the composition. More preferably, the hydraulic component makes up from about 50% to about 85% by weight of the composition. More preferably, the hydraulic component makes up from about 55% to about 85% by weight of the composition. More preferably, the hydraulic component makes up from about 60% to about 85% by weight of the composition. More preferably, the hydraulic component makes up from about 65% to about 85% by weight of the composition. More preferably, the hydraulic component makes up from about 40% to about 80% by weight of the composition. More preferably, the hydraulic component makes up from about 45% to about 80% by weight of the composition. More preferably, the hydraulic component makes up from about 50% to about 80% by weight of the composition. More preferably, the hydraulic component makes up from about 55% to about 80% by weight of the composition. More preferably, the hydraulic component makes up from about 60% to about 80% by weight of the composition. More preferably, the hydraulic component makes up from about 65% to about 80% by weight of the composition. More preferably, the hydraulic component makes up from about 40% to about 75% by weight of the composition. More preferably, the hydraulic component makes up from about 45% to about 75% by weight of the composition. More preferably, the hydraulic component makes up from about 50% to about 75% by weight of the composition. More preferably, the hydraulic component makes up from about 55% to about 75% by weight of the composition. More preferably, the hydraulic component makes up from about 60% to about 75% by weight of the composition. More preferably, the hydraulic component makes up from about 65% to about 75% by weight of the composition.

The optional polymer is a water-soluble, film-forming polymer, preferably a latex polymer. The polymer can be used in either liquid form or as a redispersible powder. A particularly preferred latex polymer is a methyl methacrylate copolymer of acrylic acid and butyl acetate (Forton VF 774 Polymer, EPS Inc. Marengo, Ill.).

Although the polymer is added in any useful amount, it is preferably added in amounts of from about 5% to 35% on a dry solids basis. More preferably, the composition includes from about 10% to about 35% polymer. More preferably, the composition includes from about 15% to about 35% polymer. More preferably, the composition includes from about 20% to about 35% polymer. More preferably, the composition includes from about 5% to about 30% polymer. More preferably, the composition includes from about 10% to about 30% polymer. More preferably, the composition includes from about 15% to about 30% polymer. More preferably, the composition includes from about 20% to about 30% polymer. More preferably, the composition includes from about 5% to about 25% polymer. More preferably, the composition includes from about 10% to about 25% polymer. More preferably, the composition includes from about 10% to about 20% polymer. More preferably, the composition includes from about 15% to about 20% polymer. More preferably, the composition includes from about 5% to about 15% polymer. More preferably, the composition includes from about 10% to about 15% polymer.

In order to form two interlocking matrix structures, water must be present in this composition. The total water in the composition should be considered when adding water to the system. If the latex polymer is supplied in liquid form, water used to disperse the polymer should be included in the composition water. Any amount of water can be used that produces a flowable mixture. Preferably, about 5 to about 35% water by weight is used in the composition. More preferably, the amount of water ranges from about 10% to about 35% by weight. More preferably, the amount of water ranges from about 15% to about 35% by weight. More preferably, the amount of water ranges from about 20% to about 35% by weight. More preferably, the amount of water ranges from about 25% to about 35% by weight. More preferably, the amount of water ranges from about 30% to about 35% by weight. More preferably, the amount of water ranges from about 15% to about 30% by weight. More preferably, the amount of water ranges from about 10% to about 30% by weight. More preferably, the amount of water ranges from about 20% to about 30% by weight. More preferably, the amount of water ranges from about 25% to about 30% by weight. More preferably, the amount of water ranges from about 15% to about 25% by weight. More preferably, the amount of water ranges from about 10% to about 25% by weight. More preferably, the amount of water ranges from about 20% to about 25% by weight. More preferably, the amount of water ranges from about 15% to about 20% by weight. More preferably, the amount of water ranges from about 10% to about 20% by weight of water per 100 parts of dry hydraulic component.

The addition of water to the hydraulic material initiates hydration reactions. Water of hydration is absorbed from the slurry to form the crystalline matrix of the cementitious material. As the free water decreases, the polymer begins forming a film and hardens. Since both of these processes occur virtually simultaneously, the crystalline matrix of the cementitious material and the polymer film become intimately intertwined in each other, forming strong links between these two substances.

In another embodiment, a thin layer of polymer-free cementitious material is applied to a scrim or basemat that is useful as an inexpensive and lightweight underlayment for ceramic tiles. Portland cement is a preferred hydraulic material, although the use of fly ash, other cements, including high alumina cements, calcium sulfates, including calcium sulfate anhydrite, calcium sulfate hemihydrate or calcium sulfate dihydrate, lime, other hydraulic materials and combinations thereof are contemplated for use in this embodiment. When used in combination with Portland cement, fly ash is preferably used in amounts of up to 60% of the total weight of hydraulic component. More preferably, fly ash is at least 10% of the total weight of the hydraulic component. More preferably, fly ash is at least 20% of the total weight of the hydraulic component. More preferably, fly ash is at least 30% of the total weight of the hydraulic component. More preferably, fly ash is at least 40% of the total weight of the hydraulic component. More preferably, the hydraulic materials include from about 40% fly ash to about 60% fly ash. Class C fly ash is the preferred fly ash.

The underlayment of this embodiment is preferably less than ⅛" (3 mm) in thickness. More preferably, the underlayment is less than 1 mm in thickness. Although the polymeric compositions described above are applicable to a wide variety of uses, cementitious compositions without polymer are obtainable having sufficient flexibility for use as an underlayment. A thin layer of a hydraulic material is applied to a basemat. The amount of water added is sufficient to form a flowable mixture. When a homogeneous mixture is obtained, the slurry is applied as a thin coating to the basemat. Preferably the coating is thin enough that no appreciable thickness is added to the basemat, but only the openings are filled in.

Any well-known additives for cements or polymer cements can be useful in any of the embodiments of the instant composition to modify it for a specific purpose of application. Fillers are added for a variety of reasons. The composition or finished product can be made even more lightweight if lightweight fillers, such as expanded perlite, other expanded materials or either glass, ceramic or plastic microspheres, are added. Microspheres reduce the weight of the overall product by encapsulating gaseous materials into tiny bubbles that are incorporated into the composition thereby reducing its density. Foaming agents used in conventional amounts are also useful for reducing the product density.

Conventional inorganic fillers and aggregates are also useful to reduce cost and decrease shrinkage cracking. Typical fillers include sand, talc, mica, calcium carbonate, calcined clays, pumice, crushed or expanded perlite, volcanic ash, rice husk ash, diatomaceous earth, slag, metakaolin, and other pozzolanic materials. Amounts of these materials should not exceed the point where properties such as strength are adversely affected. When very thin membranes or underlayments are being prepared, the use of very small fillers, such as sand or microspheres are preferred.

Colorants are optionally added to change the color of the composition or finished articles. Fly ash is typically gray in color, with the Class C fly ash usually lighter than Class F fly ash. Any dyes or pigments that are compatable with the composition may be used. Titanium dioxide is optionally used as a whitener. A preferred colorant is Ajack Black from Solution Dispersions, Cynthiana, Ky.

Set control additives that either accelerate or retard the setting time of the hydraulic component are contemplates for use in these compositiond. The exact additives will depend on the hydraulic materials being used and the degree to which the set time is being modified.

Reinforcing materials can be used to add strength to the composition. The optional addition of fibers or meshes helps hold the composition together. Steel fibers, plastic fibers, such as polypropylene and polyvinyl alcohols, and fiberglass are recommended, but the scope of reinforcing materials is not limited hereby.

Superplasticizer additives are known to improve the fluidity of a hydraulic slurry. They disperse the molecules in solution so that they move more easily relative to each other, thereby improving the flowability of the entire slurry. Polycarboxylates, sulfonated melamines and sulfonated naphthalenes are known as superplasticizers. Preferred superplasticizers include ADVA Cast by Grace Construction Products, Cambridge, Mass. and DILOFLO GW Superplasticizer of Geo Specialty Chemicals, Cedartown, Ga.

Shrinkage reducing agents help decrease plastic shrinkage cracking as the product dries. These generally function to modify the surface tension so that the slurry flows together as it dries. Glycols are preferred shrinkage reducing agents.

The hydraulic material, polymer, water and any optional components are combined in a mixer and mixed until a homogeneous blend is obtained. Preferably, the mixer is a high shear mixer providing a short residence time. For small batches of product, a typical laboratory blender is a suitable mixing device. For larger commercial operations, the use of commercially available continuous mixers manufactured by the PFT GMBH and Co. KG, based in Iphofen, Germany, are suitable. The preferred mixers have the capability of mixing as well as pumping the slurry in a continuous manner to the point of application. These mixers have a mixing chamber where all solid dry materials are blended together with the liquid additives including water using a cage agitator rotating at a high speed. In the normal mode of operation, the blended cementitious slurry continuously exits the mixing chamber and is pumped forward by a progressive cavity pump (rotor-stator type pump) to the point of application. The preferred PFT mixer models for this invention include PFT Mixing Pump G4, PFT Mixing Pump G5, PFT Monojet 2.13, PFT Mixing Pump T2E, PFT Mixing Pump MS1 and MS2.

After mixing, a flowable liquid exits from the mixer and can be poured into a mold or extruder, onto release paper or onto a basemat for shaping into an appropriate shape. Any method may be used to shape the composition, including coating, spreading, molding, extruding, calendaring, rolling, screeding, or any shaping method suitable for the article being produced. If a membrane for use as an underlayment for ceramic tile is being prepared, the composition is preferably rolled or screeded onto the basemat to form the membrane.

The composition is optionally formed on a basemat for strength and for ease in handling the finished sheets. Any suitable basemat material may be suitable for this application. Scrim, cloth, either woven or non-woven, fiber mesh, spunbond materials, and meltblown compositions are examples of workable basemats. Non-woven fibrous mats are made of polymeric materials, such as polypropylene, polyethylene, polyester or polyvinyl alcohol, or non-polymeric materials such as fiberglass.

Compared to non-woven materials, meshes and scrims are relatively larger strands or yarns that are oriented linearly. The yarns running in different directions may be spaced such that there are openings between the yarns, but use of mesh with no openings is also contemplated. The yarns may run in two or more directions and are suitably made of polymeric materials, including Kevlar, polypropylene, polyethylene, polyvinyl alcohol and polyesters inorganic materials, such as carbon and steel, natural fibers or a combination thereof. A preferred mesh material is a single layer of a polymer coated, glass, open weave mesh commonly known as fly screen mesh.

Although a single ply basemat is suitable, a multiple ply mat is often preferred. It is advantageous to combine different types of basemat materials to create a basemat that is optimized for particular uses. When used as an underlayment for ceramic tile, a three-ply composite basemat is particularly advantageous. The use of fibrous materials is preferred to control structure and porosity. At least three individual plies or laminas possess different structure and porosity and serve different functions in the finished product. The preferred basemat is composed of at least two different types of laminas. The first lamina type is highly porous, facilitating good slurry absorption. Non-woven fabrics from a spunbond process are preferred for the first lamina. The spunbond process is well known to artisans of fabric-making, and produces a high porosity lamina of long, continuous fibers that are virtually unending. The second lamina type is preferably highly impervious to water, resisting migration of liquids across it. This layer is preferably made using a meltblown manufacturing process, which is also well-known in the art. A meltblown lamina is composed of fibers that are short and fine, forming a network of fibers that is very dense and complex, making it difficult for liquids to pass through it.

A preferred basemat for this invention includes one meltblown lamina sandwiched between two spunbond laminae. The center meltblown lamina resists migration of liquids across the basemat, adding to the resistance to the flow of water or other liquids across the underlayment. The spunbond laminae are placed on either side of the meltblown lamina to provide high porosity. Porosity of the spunbond material allows for good infiltration and absorption of the cementitious slurry. The large fibers become incorporated into the crystal matrix of the cementitious material, forming a strong bond.

The laminae are bonded to each other by any suitable means. Three-ply composites are commercially available as an S-M-S laminate by Kimberly-Clark, Roswell, Ga. This product is made of polypropylene fibers. While providing a barrier to liquids, the material is still breathable, allowing water vapor to pass through it. Depending upon the end application and the performance requirements, other lamina may be more suitable for a particular application. U.S. Pat. No. 4,041,203, herein incorporated by reference, fully describes an s-m-s laminate and a method for making it.

In a commercial scale production line, the membrane is preferably made by a process beginning with unwinding the basemat from a spool and running it toward the mixing area. If the basemat is permeable by the slurry, an optional release paper is useful underneath the basemat to contain overspill of the slurry. With an impermeable basemat and proper design of the coating station, the need for the release paper can be eliminated. The basemat is aligned with and placed on a surface to be fed to coating equipment for application of the slurry.

The coating slurry is prepared by mixing the polymer and the hydraulic component in water. Preferably the mixing is done in a high shear mixer. Either a continuous or a batch mixer is useful, depending on the size of the batch being prepared.

The basemat is provided and the cementitious slurry is applied to it. Any coating apparatus is adaptable for use with the slurry, including rod coaters, curtain coaters, sprayers, spreaders, extrusion, pultrusion, roller coaters, knife coaters, bar coaters and the like to coat the basemat and form a sheet. One preferred method of spreading the slurry is by utilizing a screed bar. The screed bar can be metal, plastic, rubber or any material that scrapes excess coating from the basemat. A thin coating is obtained by keeping the screed bar in contact with the basemat. As a head of slurry builds up in front of the screed bar, the slurry spreads and uniformly covers the face of the basemat.

When spreading the slurry, it can be advantageous to position the screed bar over a flexible surface or no surface at all. Pressure is applied to the screed bar to build up a head and to obtain a thin coating of slurry. In testing, when pressure was applied with the basemat positioned over a firm surface, the basemat stopped moving and started to tear. Moving the coating operation to a portion of the line where the basemat was supported by a flexible belt allowed sufficient pressure to be applied to the mat to obtain a thin coating without bunching or tearing of the basemat. It is also possible to coat the basemat with no surface directly under the basemat. In this case, a screed bar or other coating device is positioned over the suspended basemat. A device for catching and recycling excess coating material is preferably positioned underneath, but not touching, the basemat.

Thicker coatings of slurry are obtainable by repeating the coating process multiple times. Preferably, two screed stations are present for application of two coatings that are substantially similar. If it is desirable to have a non-directional sheet, the cementitious slurry is applicable to both sides of the basemat. When no basemat is used, the slurry can be coated onto release paper and the paper removed when the product is set and dry.

After the slurry has been applied to the basemat, it is allowed to dry, set and harden. Any method of drying the slurry is useful, including, air drying at room temperature, oven or kiln drying or drying in a microwave oven. When allowed to dry at room temperature, a membrane is ready to use, package or store in a few hours. More preferably, the coated mat or coated paper is sent to an oven where it dries and sets rapidly. A slurry thinly applied to a basemat dries in less than 10 minutes in a 175° F. (80° C.) oven. The polymer is also curable using light, particularly light in the ultraviolet wavelength range. If the coating is made with hot polymer, curing time is decreased, but the pot life is also decreased. Exact drying times will depend on the exact composition chosen, the thickness of the slurry and the drying temperature. When the composition is set, the release paper, if present, is removed by conventional methods.

In the examples that follow, all components are measured by weight unless otherwise stated. The latex polymer used here, Forton VF774, was in a liquid form and included 51% polymer solids and 49% water. In the examples that follow, "water" refers to added water and does not include that in the latex polymer. Of the amounts reported for the polymer, the measured weight, including both the solids and the water are reported.

EXAMPLE 1

A slurry was made from the components from Mix 1 of Table 1. No water in addition to that contained in the liquid polymer was added to form the slurry.

TABLE 1

| Component | Trade Name | Mix 1 |
| --- | --- | --- |
| Class C Fly Ash | Bayou | 66.8% |
| Portland cement | | 0 |
| Water | | 0 |

TABLE 1-continued

| Component | Trade Name | Mix 1 |
| --- | --- | --- |
| Acrylic Polymer Latex | Forton VF774 | 32.8% |
| Polycarboxylate Superplasticizer | Adva Cast | 0.3% |
| Colorant | Ajack Black 8044 | 0.13% |

All of the above components were placed in a high-shear blender and blended for 30 seconds to form a slurry. The resulting slurry was applied by trowel as a coating on SMS Laminate. The resulting product was allowed to dry for two hours and was subsequently rolled into a cylinder 1" (2.5 cm) in diameter.

EXAMPLE 2

Another cementitious membrane was made by again mixing the components of Table I and applying it to SMS Laminate. The resulting coated product was transferred to a 210° F. (99° C.) oven for three minutes. Subsequently, the soft, flexible membrane was removed from the oven and rolled less than 4 minutes after the slurry was applied to the basemat.

EXAMPLE 3

Two flexible membranes were manufactured using a bi-directional mesh basemat made of polyvinyl chloride coated fiberglass. The mesh had an open and porous structure with 9 fiberglass yarns per inch, running in both the warp and weft directions. The two hydraulic compositions of Table II were each applied to a piece of this basemat.

TABLE II

| Ingredient | Mix 1 (wt %) | Mix 4 (wt %) |
| --- | --- | --- |
| Class C Fly Ash (Bayou) | 66.79 | 62.42 |
| Water | 0.00 | 6.70 |
| Acrylic Polymer Latex[a] (Forton VF774) Polymer solids content - 51% and Water content - 49% | 32.74 | 30.59 |
| Polycarboxylate superplasticizer (Adva Cast) | 0.34 | 0.16 |
| Colorant (Ajack Black AJ 61) | 0.13 | 0.13 |

FIG. 1 shows a photograph of the two membranes using the fiberglass mesh basemat. As shown, the fiberglass mesh was completely coated and embedded with the fly ash composition of the invention. Flexibility and foldability of the finished product is shown by the tight rolls less than 1" (2.54 cm) in diameter (compared to the pen, also shown) into which the membrane is rolled.

EXAMPLE 4

A flexible, rollable, cement-based membrane was manufactured by preparing and applying the cementitious formulation shown in Table 1 of Example 1 on an SMS polymer laminate. A floor was constructed using the prepared membrane for durability evaluation according to ASTM C627 Robinson Floor Test. During the Robinson Floor Test, wheels of varying hardness and carrying varying loads are sequentially moved over the tile surface for 900 revolutions each. After each cycle, the tiles are studied to determine if any of them are loose, broken or chipped. The grout is examined to establish if it has popped, cracked or powdered.

23/32" thick plywood panels were applied to framing joists spaced 16" on center. Flexible, cement-based membrane was bonded to the plywood subfloor with thin-set mortar using a ⅛"×⅛" U-notch trowel. 2"×2" ceramic mosaic tiles were bonded to the flexible, cement-based membrane using thin set mortar. The constructed floor when tested per ASTM C627 test method failed in the 4th cycle achieving residential rating per 2005 Tile Council of America Handbook.

EXAMPLE 5

An underlayment was prepared by using the components listed in Table III.

TABLE III

| Component | Amount | %, by weight hydraulic component |
|---|---|---|
| Portland Cement, Type III | 100 parts | 46.5% |
| Class C fly ash | 95 parts | 44.2% |
| High Alumina Cement | 15 parts | 7.0% |
| Landplaster | 5 parts | 2.3% |
| Silica Sand | 408 parts by weight | 190% |
| Water | q.s. to make 8" patty | |

EXAMPLE 6

A slurry was made from the components from Mix 5 of Table IV. No water in addition to that contained in the liquid polymer was added to from the slurry.

TABLE IV

| Component | Trade Name | Mix 5 | Mix 6 | Mix 7 |
|---|---|---|---|---|
| Class C Fly Ash | Bayou | 66.8% | 32.2% | 0 |
| Portland cement | | 0 | 32.2% | 62.4% |
| Water | | 0 | 3.53 | 6.54 |
| Acrylic Polymer Latex | Forton VF774 | 32.8% | 31.58% | 30.60% |
| Polycarboxylate Superplasticizer | Adva Cast | 0.3% | 0.3% | 0.3% |
| Colorant | Ajack Black 8044 | 0.13% | 0.13% | 0.13% |

All of the above components were placed in a high-shear blender and blended for 30 seconds to form a slurry. A panel ¼" (0.6 mm) in thickness and measuring 6"×12" (15 cm ×30 cm) was also cast in the laboratory from the slurry. It was dried at room temperature for several hours. As the panel dried, there was no shrinkage cracking of the material. The nature of the composite was similar to that of rubber, only it was harder and more flexible.

The flexibility of the resulting panel is demonstrated. The panel was flexed along its 12" (30 cm) length until an arch approximately 4" (10 cm) in height was formed. There was no visible cracking as a result of flexing the material. Even after such large deformations, the panel regained its original shape with no signs of damage.

Fatigue of the material was tested by repeated flexing of the cast flat panel into a 4" (10 cm) arch. After 50 such flexings, there was no sign of cracking or damage. The material has an ultimate tensile strain capacity of >2% and a tensile toughness of 30 inch-pounds per square inch (435 N-m/m$^2$).

The above hydraulic mixture was prepared and applied by squeegee to a single layer of a polymer coated, glass, open weave mesh commonly known as fly screen mesh, and allowed to dry.

Two samples of the underlayment were tested using the ASTM C627 Robinson Floor Test, herein incorporated by reference. Sample floors for the test were prepared on a ¾" oriented strand board (OSB) of wood. The underlayment was attached to the OSB using mastic. No mechanical fasteners were used. Two-inch (5 cm) ceramic tiles were then laid on the underlayment using a thin-set adhesive, then the tiles were grouted. The samples were allowed to cure at least 28 days from the date of manufacture before the test was performed.

Neither of the two samples showed any defects in the tile or grout through the 6$^{th}$ cycle of the test. One of the samples failed on the 7$^{th}$ cycle, while the second sample passed the 8$^{th}$ cycle of the test.

While particular embodiments of the present fly ash composition and method for making it has been shown and described, it will be appreciated by those skilled in the art that changes and modifications may be made thereto without departing from the invention in its broader aspects and as set forth in the following claims.

What is claimed is:

1. A flexible membrane in rolled form comprising:
   a basemat in rolled form having at least three plies comprising a center ply of a meltblown polymer and two outer plies of spunbond polymer, wherein said center ply is impervious to a hydraulic composition slurry comprising, by weight percent, 66.8% Class C fly ash, 32.8% acrylic polymer latex, 0.30% polycarboxylate superplasticizer, and 0.13% colorant; and
   a set and dried flexible coating on one side of said basemat, said coating comprising:
      40% to 80% of a hydraulic component comprising about 62% to about 67% Class C fly ash by weight; and
      about 15% to about 35% of a water-soluble, film-forming acrylic polymer on a dry solids basis, wherein said coating is characterized by having a set and dry time of approximately 10 minutes in a 175° F. (80° C.) oven and wherein said coating is obtained by drying the flexible membrane in an oven;
   wherein said membrane is less than 3 mm thick and is rollable into a cylinder.

2. A tile underlayment membrane, wherein the membrane is flexible and comprises:
   a basemat having at least three plies comprising a center ply of a meltblown polymer and two outer plies of a spunbond polymer, wherein said center ply is impervious to a coating slurry prepared by mixing a water-soluble, film-forming polymer and a hydraulic component in water; and
   a flexible, set and hardened coating on one side of said basemat, said coating comprising:
      40% to 80% of a hydraulic component comprising about 62% to about 67% Class C fly ash by weight;
      a plasticizer selected from the group consisting of a polycarboxylate, sulfonated melamine and sulfonated naphtalene; and
      about 15% to about 35%
      a film-forming acrylic polymer on a dry solid basis, wherein the acrylic polymer has polymerized and hardened on the basemat and wherein the polymer and Class C fly ash are intertwined in each other and have formed strong links; and
   wherein the flexible tile underlayment membrane is set and hardened.

3. The tile underlayment membrane of claim 2, wherein the membrane is set and hardened and the polymer is polymerized and hardened by exposure to heat.

4. The tile underlayment membrane of claim 2, wherein the membrane is set and hardened and the polymer is polymerized and hardened by exposure to heat in an oven.

5. The tile underlayment membrane of claim 2, wherein the membrane is set and hardened and the polymer is polymerized and hardened by exposure to heat in an oven at about 175° F. (80° C.).

6. The tile underlayment membrane of claim 5, wherein the membrane is set and hardened and the polymer is polymerized and hardened by exposure to heat in an oven at about 175° F. (80° C.) for approximately 10 minutes.

7. The tile underlayment membrane of claim 2, wherein the membrane is less than 3 mm thick.

8. The tile underlayment membrane of claim 2, wherein the membrane is in rolled form.

9. The tile underlayment membrane of claim 2, wherein the coating was prepared from a slurry to which the acrylic polymer was supplied as acrylic polymer latex.

10. The tile underlayment membrane of claim 2, wherein the coating was prepared from a slurry to which the acrylic polymer was supplied as about 15% to 17% acrylic polymer latex on a dry solids base.

11. The tile underlayment membrane of claim 2, wherein the polymer is a methyl methacrylate copolymer of acrylic acid and butyl acetate.

\* \* \* \* \*